United States Patent
Pitchers et al.

(10) Patent No.: US 9,253,040 B2
(45) Date of Patent: Feb. 2, 2016

(54) GROUPING WIRELESS LIGHTING NODES ACCORDING TO A BUILDING ROOM LAYOUT

(75) Inventors: Stephen M. Pitchers, Redhill (GB); Paul R. Simons, Redhill (GB)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 2502 days.

(21) Appl. No.: 11/817,880

(22) PCT Filed: Mar. 8, 2006

(86) PCT No.: PCT/IB2006/050720
§ 371 (c)(1),
(2), (4) Date: Sep. 6, 2007

(87) PCT Pub. No.: WO2006/095316
PCT Pub. Date: Sep. 14, 2006

(65) Prior Publication Data
US 2008/0218334 A1    Sep. 11, 2008

(30) Foreign Application Priority Data
Mar. 11, 2005    (EP) ..................................... 05101929

(51) Int. Cl.
*H04Q 5/22*    (2006.01)
*H04L 12/24*    (2006.01)
*H05B 37/02*    (2006.01)

(52) U.S. Cl.
CPC ............ *H04L 41/0893* (2013.01); *H04L 41/12* (2013.01); *H05B 37/02* (2013.01); *H05B 37/0272* (2013.01); *H04L 41/22* (2013.01)

(58) Field of Classification Search
CPC .... H04L 41/0893; H04L 41/12; H05B 37/02; H05B 37/0272
USPC ................ 340/825, 10.1–10.6, 572.1–572.9; 235/375–385
See application file for complete search history.

(56) References Cited

U.S. PATENT DOCUMENTS

| 5,339,330 | A  | * | 8/1994  | Mallinckrodt ................ 370/320 |
| 5,726,644 | A  | * | 3/1998  | Jednacz et al. .............. 340/9.14 |
| 6,314,294 | B1 | * | 11/2001 | Benveniste ................ 455/452.2 |
| 6,499,006 | B1 | * | 12/2002 | Rappaport et al. .............. 703/20 |
| 6,727,816 | B1 | * | 4/2004  | Helgeson ..................... 340/540 |

(Continued)

FOREIGN PATENT DOCUMENTS

JP    2006217390 A    8/2006
WO    01/97466 A1    12/2001

OTHER PUBLICATIONS

Patwari, et al., "Relative Location Estimation in Wireless Sensor Networks," IEEE Transactions on Signal Processing, vol. 51, No. 8, Aug. 2003 (12 pp.).

*Primary Examiner* — James Yang
(74) *Attorney, Agent, or Firm* — Meenakshy Chakravorty

(57) ABSTRACT

A method determines the relative locations of wirelessly controllable service device nodes and switching control nodes within a building. At least some of the service device nodes are located in different rooms of the building and should be allocated to switching control nodes on a room-specific basis. Wireless communication is established between the nodes to determine relative spatial positions of selected nodes using received signal strength indication (RSSI) values indicative of a distance of separation between two communicating nodes. The service device nodes are then grouped into two or more groups, a first group corresponding to service device nodes in one room and a second group corresponding to service device nodes in a second room, based on spatial distribution of the service device nodes as indicated by the RSSI values. The service device nodes of each group are then allocated to at least one associated switching control node.

21 Claims, 2 Drawing Sheets

(56) References Cited

U.S. PATENT DOCUMENTS

| | | | |
|---|---|---|---|
| 7,408,456 B2 * | 8/2008 | Whitesmith et al. | 340/500 |
| 2002/0089722 A1 * | 7/2002 | Perkins et al. | 359/155 |
| 2003/0206115 A1 * | 11/2003 | Krumm et al. | 340/825.49 |
| 2004/0196140 A1 * | 10/2004 | Sid | 340/3.1 |

* cited by examiner

GROUPING WIRELESS LIGHTING NODES ACCORDING TO A BUILDING ROOM LAYOUT

The present invention relates to methods and apparatus for commissioning wireless lighting nodes in a building, and in particular to assigning each of a plurality of lighting nodes or luminaires to respective switching control nodes.

Use of wirelessly controlled lighting units or luminaires in buildings (hereinafter referred to generally as 'lighting nodes') is becoming increasingly popular, since it can substantially reduce lighting installation costs. Physical wires between the lighting switches or actuation sensors (hereinafter referred to as 'switching control nodes') and the lighting nodes are replaced by wireless (e.g. radio) links. All lighting nodes and switching control nodes need only be connected to an appropriate power source and need not be electrically connected. Each luminaire includes a wireless receiver and each switching control node includes a wireless transmitter. During commissioning, each luminaire is identified and assigned to a particular switching control node or nodes. Typically, multiple luminaires are assigned to a particular switching control node, e.g. to operate multiple luminaires within one large room.

A significant disadvantage that remains in the prior art is that the commissioning process is time consuming and can interfere with the ability of other contractors on a building site to proceed with their work. For example, the commissioning electrician must typically selectively actuate luminaires or groups of luminaires throughout the building in order to work out which lighting nodes should be assigned to which switching control points. Other parts of the building could be in darkness while this operation continues. Another disadvantage is that the task of node assignments is a skilled job requiring the services of a lighting control specialist.

A number of prior art documents (e.g. WO 01/97466, and Patwari et al: "Relative Location Estimation in Wireless Sensor Networks", IEEE Transactions on Signal Processing, vol. 51, no. 8, August 2003) have addressed problems related to spatially locating wireless nodes in networks, but none of these has specifically addressed the problems of automatically assigning lighting nodes to switching control nodes.

It is an object of the present invention to overcome or mitigate at least some of the disadvantages indicated above.

According to one aspect, the present invention provides a method for determining the relative locations of plural wirelessly-controllable building service device nodes and switching control nodes within a building, at least some of the plural building service device nodes being located in different rooms of the building, comprising the steps of:

establishing wireless communication between the nodes to determine relative spatial positions of selected nodes using received signal strength indication (RSSI) values indicative of a distance of separation between two communicating nodes;

grouping the building service device nodes into two or more groups, a first group corresponding to service device nodes in a first one of said different rooms and a second group corresponding to service device nodes in a second one of said different rooms, based on spatial distribution of service device nodes as indicated by the RSSI values; and allocating the service device nodes of each group to at least one associated switching control node.

According to another aspect, the present invention provides an apparatus for allocating plural wirelessly controllable building service device nodes to appropriate switching control nodes within a building, at least some of the plural building service device nodes being located in different rooms of the building, comprising:

transceivers for establishing wireless communication between the nodes to determine relative spatial positions of selected nodes using received signal strength indication (RSSI) values indicative of a distance of separation between two communicating nodes;

a microprocessor for grouping the lighting nodes into two or more groups, a first group corresponding to service device nodes in a first one of said different rooms and a second group corresponding to service device nodes in a second one of said different rooms based on spatial distribution of lighting nodes as indicated by the RSSI values; and allocation means for allocating the lighting nodes of each group with at least one associated switching control node.

According to another aspect, the present invention provides a switching control node for switching wirelessly controllable lighting nodes in a building, and for automatically selecting lighting nodes for allocation to the switching control node where at least some of the plural lighting nodes are located in different rooms of the building, comprising:

a transceiver for establishing wireless communication between the nodes to determine relative spatial positions of selected nodes using received signal strength indication (RSSI) values indicative of a distance of separation between two communicating nodes;

a microprocessor for grouping the lighting nodes into two or more groups, a first group corresponding to lighting nodes in one of said different rooms and a second group corresponding to lighting nodes in another of said different rooms, based on spatial distribution of lighting nodes as indicated by the RSSI values; and allocation means for allocating the lighting nodes of the first group for operation by at least one associated switching control node and for not allocating the lighting nodes of the second group.

Embodiments of the present invention will now be described by way of example and with reference to the accompanying drawings in which.

A number of techniques are available for determining the spatial position of wirelessly connected nodes in a network. One such example is the signal 'time of flight' (ToF) approach, in which the time taken for signals passing between nodes is used to estimate the distance between the nodes. This provides a very accurate estimate of distances between nodes, and is relatively immune to physical obstructions between the signaling nodes. Therefore, it is a popular method for determining distance between nodes. An alternative technique is to use received signal strength indication (RSSI) measurements to provide an estimate of the distance between two nodes. As the received signal strength tends to decline with increasing distance, the RSSI reading can be converted into a practical estimate of range.

The RSSI technique is less accurate than ToF ranging, and is generally held to be less useful for automatic position finding. One characteristic of RSSI ranging is that it is affected, in indoor situations, by absorption and dispersion by walls and other partitions within the building. However, the inventors have recognised that this apparent disadvantage can actually be a positive advantage in certain circumstances. The present invention exploits an artefact of the RSSI ranging technique to advantage in the context of assigning switching control nodes to lighting nodes. To this end, it has been recognised that the goal is not simply to derive an accurate representation of the topology of the installation, but use of a determined topology to enable commissioning of the lighting system, which means figuring out which lighting node should be controlled by which switching node.

The effect of a wall interposed between two nodes is to absorb more of the signal, so that an RSSI measurement will be significantly lower and consequently the perceived distance will be greater than the actual distance. It can be seen that this will tend to group together nodes belonging to the same room. This is exactly the kind of information that is useful in assigning luminaires to switches.

Figure 1:
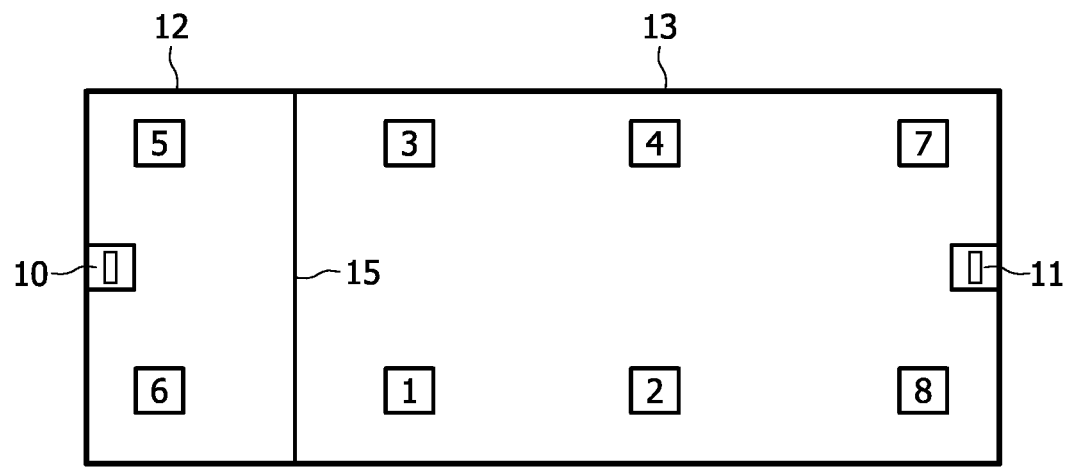
FIG. 1 shows a schematic plan view of a lighting installation occupying two rooms of a building.

FIG. 1 shows an installation of eight luminaires (lighting nodes) 1 . . . 8 and two switches (switching control nodes) 10, 11 within two separate rooms 12, 13 of a building. In many contexts, we can assume that each switch 10, 11 should control only the lights within its own room. Each lighting node 1 . . . 8 has a unique node address and the challenge is to determine which lighting node addresses should be grouped together to be controlled by each switch. Without knowledge of the wall 15 dividing the two rooms, an automatic assignment algorithm might partition the lights equally and wrongly assign four lights to each switch, so that nodes 3 and 1 are assigned to the left switch 10 along with nodes 5 and 6. However, the RSSI ranging technique provides a solution, since the readings between nodes 5 and 3, and between 6 and 1, etc, are affected by the presence of the wall 15.

Figure 2:
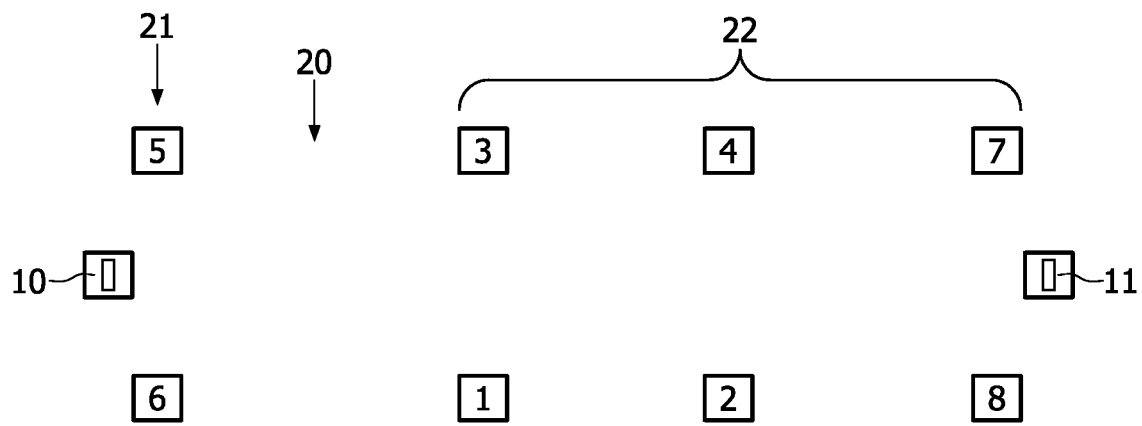
FIG. 2 shows a schematic plan view of a lighting installation topology as perceived by received signal strength ranging.

Using the RSSI ranging technique to derive the topology makes it appear that nodes 5 and 3 are much further apart than nodes 3 and 4, 4 and 7, etc, as shown in the node topology diagram of FIG. 2. This creates a gap in the topology, which although incorrect from the point of view of actual physical location of nodes, is actually helpful in the assignment process. Because the left hand switch 10 and nodes 5 and 6 are closely related they form a natural first group 21. There appears to be a gap 20 between this first group 21 and the other nodes, which themselves are closely related in a second group 22, so that correct 'room-based' assignments can be made. Such gaps act as strong indicators of how lighting nodes may be partitioned for assignment.

Because of the perceived gap 20 in the topology as determined by RSSI techniques, the presence of the wall 15 that divides the floor space may be inferred by an automatic commissioning system.

A number of prior art documents (such as WO 01/97466 mentioned above) discuss techniques for automatically determining the physical layout of a network by using trigonometric techniques where at least three nodes of known spatial position are used to determine the relative position of a fourth node. Based on the initial known positions of just three nodes, it is normally possible to systematically determine the spatial locations of all other nodes in the network, providing each node of unknown position is within range of at least three other nodes whose positions are either known, or can be determined by reference to the positions of other known nodes. In the event that a floor plan of the building is available to the commissioning system, this would allow the commissioning system to associate the discovered nodes with the appropriate nodes on the plan, in which case, the detection of the presence of walls by the commissioning system might not be strictly necessary.

However, the ability of the commissioning system to infer the positions of walls and other partitions confers a number of advantages.

Firstly, if any walls or partitions have been erected that were not part of the available floor plan, the system can detect this and adapt the node allocations accordingly.

Secondly, the inferred walls make it possible to orientate the automatically derived topology with existing parts of the building plan, even where the lighting nodes are very regular in layout, making it unnecessary to start with prior knowledge of several reference nodes.

Thirdly, it is no longer necessary to have a floor plan at all. The desired node grouping can be perceived directly without reference to external information. This is a major benefit of this approach. This is particularly useful for installations in domestic premises or small offices, where simplicity of installation is a selling point for a wireless lighting system.

In accordance with the above principles, a number of techniques may be deployed for determining the locations of plural such lighting nodes within a building, for the purpose of grouping the lighting nodes for association with respective switching control nodes.

In a relatively simple installation, a designated node (which may be either a switching control node, a lighting node, or even a gateway node in communication with a building management system) initiates wireless communication with each other node in its communication range to determine a distance of separation from each other node. This simple indication of linear distance from the designated node to each nearby node may be sufficient alone to determine which nodes should be grouped as belonging to one room.

Thus, for example, a switching control node 11 could be programmed, on initialization to attempt to communicate with every node within its communication range, and determine an RSSI value relative to that node. In the example of FIG. 2, although switching control node 11 will not know the two or three dimensional spatial location of each node 1 to 8, it will be able to detect that nodes 7, 8, 2, 4, 1, 3 have radial separation from the switching node 11 that shows an increasing distance (in pairs) at approximately regular intervals. It will also be able to detect that there is then apparently a significant jump in distance of separation before nodes 5 and 6. This alone may be sufficient for switching control node 11 to allocate the lighting nodes 7, 8, 2, 4, 1 and 3 to itself and to 'discard' lighting nodes 5 and 6. It will be understood, of course, that a similar operation performed by switching node 10 would have the result of allocating to itself lighting nodes 5 and 6, but 'discarding' lighting nodes 7, 8, 2, 4, 1 and 3.

Stated another way, the designated node is able to determine group boundaries (corresponding to room boundaries) by way of observing significantly larger gaps between adjacent nodes than gaps between other adjacent nodes.

Of course, the use of only a linear measure of distance from a designated node to all other nodes may not be sufficient to unambiguously allocate lighting nodes to room groups. Therefore, in a preferred arrangement, at least two dimensional position sensing is used by providing the system with at least three known reference node positions. The network of nodes is then able to generate a topographic map or determine a network topology, based on the RSSI values. The system can then define group boundaries by way of identifying significantly larger gaps 20 between adjacent nodes 5-3 and 6-1, than gaps between other adjacent nodes, e.g. 34, 1-2 etc.

The identification of significantly larger gaps can be by any suitable method. For example, the node separations as measured by the RSSI values can be grouped by determining an average inter-node spacing and identifying boundaries where the inter-node spacing exceeds the average by more than a predetermined amount or percentage.

Generally speaking, lighting nodes in large buildings, or lighting nodes providing background lighting, are often spaced at fairly regular intervals. Thus, a significant departure from this fairly regular spacing is strongly suggestive of the presence of a wall or other partition causing reduction in the RSSI.

Furthermore, switching control nodes for a room are often grouped together, e.g. by an entrance to the room. Thus, the presence of separated switching control nodes can be used as an indicator to search for significant gaps between lighting nodes corresponding to the walls of the room in which the switching control nodes are located.

In another example, account may be taken of experimentally determined levels of attenuation in RSSI values caused by building walls and partitions to identify an expected increase in adjacent node separation caused by the extra attenuation.

In another example, where a building plan is available showing absolute locations of the nodes in the network, this may be used for comparison with the topographic map as generated from the RSSI values. It will be noted that any differences in spacing between the nodes in the building plan and the generated topographic map will indicate room boundaries, i.e. partition walls. The lighting nodes can then be grouped accordingly.

In another example, the identification of significantly larger gaps may be made by reference to another topographic map automatically generated using ToF signals between the nodes. As discussed above, ToF measurements provide a very accurate estimate of distances between nodes, relatively unaffected by physical obstructions between the signaling nodes such as building walls. Thus, if the nodes determine their relative positions using both RSSI techniques and ToF techniques, a comparison of both generated topographic maps will also serve to highlight differences in spacings between nodes that correspond to walls of the building. These differences in spacings between the nodes also serves to enable grouping of the nodes appropriately.

Once the group boundaries have been determined, the individual groups can readily be assigned or allocated to an appropriate switching control node. In general, this will involve programming each of a first group of lighting nodes to respond to one or more first switching control nodes and programming each of a second group of lighting nodes to respond to one or more second switching control nodes, and so on until all lighting nodes have been accounted for.

More generally, the task of programming or assigning switching control nodes to respective lighting nodes can be performed by any one of: (i) programming selected switching control nodes to control (i.e. send signals to) specified lighting nodes; (ii) programming selected lighting nodes to be responsive to signals from specified switching control nodes; or (iii) a combination of (i) and (ii) above.

If a group of lighting nodes determined by the system to be in the same room is larger than a certain number of lighting nodes, the group may be divided between two or more switching control nodes. For example, some of the first group of lighting nodes (corresponding to a first lighting zone) may be programmed to be responsive to one switching control node and others of the first group of lighting nodes (corresponding to a second lighting zone) may be programmed to be responsive to another switching control node.

It will be understood that a group of lighting nodes (or each zone of a group of lighting nodes) may respond to two or more switching control nodes, e.g. a main switch and a motion sensor or separate switches located at different doorways. Although lighting nodes are normally controlled by a switching control node that is located in the same room as the lighting nodes, a switching control node may control lighting nodes that are not in the same room, e.g. in a hallway outside.

It will be recognised from the above that the activities of determining relative locations of the lighting nodes and allocating an appropriate switching control node may be performed on a distributed or global basis. In other words, a central controlling node may be used to receive all topology information and assign specific lighting nodes to appropriate switching control nodes. Alternatively, each switching control node 10, 11 may determine and assign its own lighting nodes as discussed above.

Figure 3:
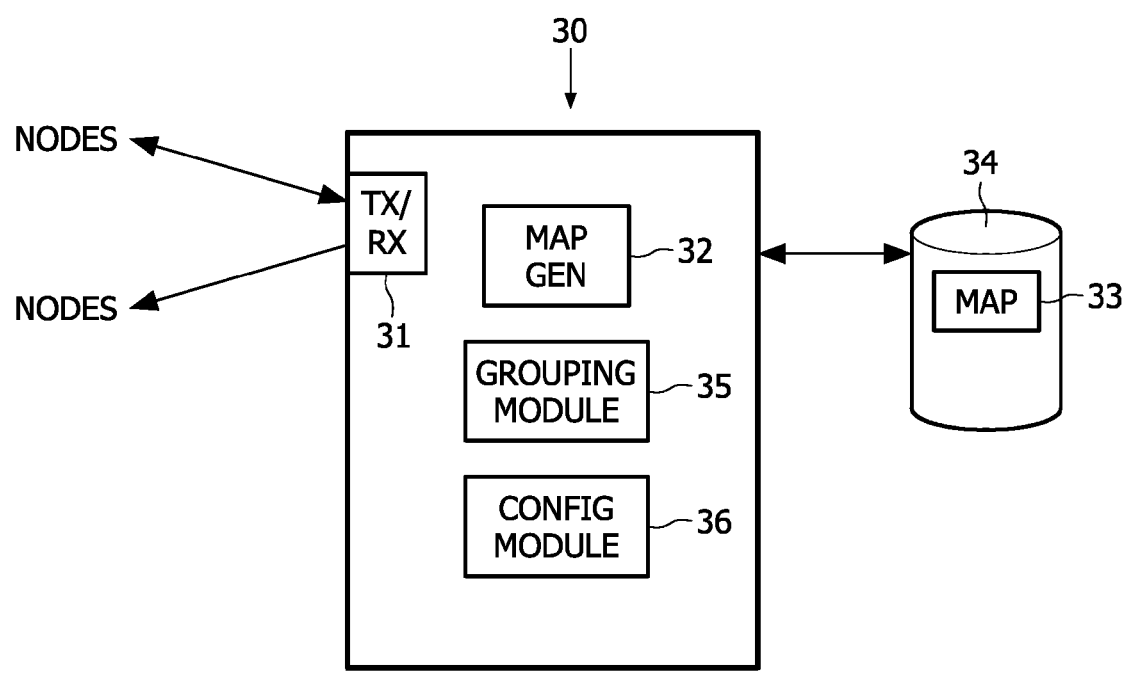
FIG. 3 shows a schematic diagram of an apparatus for allocating plural wirelessly controllable lighting nodes to appropriate switching control nodes within a building.

As shown in FIG. 3, a central controlling node 30 includes a transceiver 31 for receiving information on location of lighting nodes and control nodes in the network, and a map generator module 32 for generating a network topographic map therefrom. The generated map 33 is stored in memory 34. A grouping module 35 uses the map 33 to determine how the lighting nodes should be grouped in accordance with the strategies discussed above. A configuration module 36 then issues, using transceiver 31, configuration signals to appropriate lighting nodes and to relevant switching control nodes to thereby allocate appropriate lighting nodes to respective switching control nodes. The functions of central controlling node 30 could be located within a designated lighting node or switching control node, or in a dedicated central controller, such as a building management system.

The invention has been particularly described in connection with the installation and commissioning of wirelessly controlled lighting nodes in a building. It will be noted that a similar principle can also be applied to other forms of wirelessly controllable devices installed within a building that might need to be grouped for control by remotely located switching control nodes, on a room by room basis, such as air conditioning or other ventilation units, window blinds or curtains and the like. The expression 'building service device' as used herein is therefore intended to encompass all such remotely controllable electrical devices installed in a building.

Other embodiments are intentionally within the scope of the accompanying claims.

The invention claimed is:

1. A method for determining the relative locations of a plurality of nodes within a building, the nodes including a plurality of wirelessly-controllable service device nodes and a plurality of switching control nodes, at least some of the service device nodes being located in different rooms of the building with respect to each other, the method comprising:
   establishing wireless communication between the nodes to determine relative spatial positions of the nodes using received signal strength indication (RSSI) values each indicative of a distance of separation between two of the nodes;
   grouping the service device nodes into at least two groups, including a first group of the service device nodes located in a first one of said different rooms, and a second group of the service device nodes located in a second one of said different rooms, based on a spatial distribution of the nodes as indicated by the RSSI values; and
   allocating the service device nodes of the first group to have a switching operation thereof controlled by a first of the switching control nodes, and allocating the service device nodes of the second group to have a switching operation thereof controlled by a second of the switching control nodes.

2. The method of claim 1, wherein allocating the service device nodes of the first group includes programming each of the service device nodes of the first group to respond to the first switching control node, and wherein allocating the service device nodes of the second group includes programming each of the service device nodes of the second group to respond to the second switching control node.

3. The method of claim 1, wherein allocating the service device nodes of the first group and allocating the service device nodes of the second group includes programming the first switching control node to control each of the first group of service device nodes, and programming the second switching control node to control each of the second group of service device nodes.

4. The method of claim 2, wherein the first switching control node is located in the first room and the second switching control node is located in the second room.

5. The method of claim 1, wherein grouping the service device nodes comprises determining a network topology based on the RSSI values and defining a group boundary in the network topology where there is a significantly larger gap between a first pair of the service device nodes that are adjacent to each other than gaps between other service device nodes that are adjacent to each other in the network topology.

6. The method of claim 1, wherein grouping the service device nodes comprises determining a network topology based on the RSSI values and defining a group boundary in the network topology where a spacing between a first pair of the service device nodes that are adjacent to each other is significantly larger than an average spacing between other service device nodes that are adjacent to each other in the network topology.

7. The method of claim 1, wherein establishing wireless communication between the nodes comprises measuring RSSI values based on signals communicated respectively between a designated node and each one of a plurality of the service device nodes within communication range of the designated node to determine a distance of separation between the designated node and each of the service device nodes within communication range of the designated node.

8. The method of claim 7, wherein the designated node is one of the service device nodes.

9. The method of claim 7, wherein the designated node is a gateway node to a building management system or one of the switching control nodes.

10. The method of claim 1, wherein establishing wireless communication between the nodes comprises instructing a plurality of the nodes in the network to determine a respective RSSI value for communication with a target node to thereby determine the relative position of the target node, and repeating this operation for other target nodes to thereby generate a topographic map of the service device nodes in the building.

11. The method of claim 10, wherein grouping the service device nodes comprises comparing the generated topographic map with a building services plan, and using differences between: (1) node spacings in the topographic map, and (2) node spacings in the building plan, to establish positions of room boundaries in the building.

12. The method of claim 1, wherein each of the service device nodes comprises a luminaire, and wherein each of the switching control nodes comprises an on-off switch, a dimmer controller, a motion sensor, or a presence sensor.

13. The method of claim 1, wherein each of the service device nodes comprises any of a heating unit, a ventilation unit, or an air conditioning unit.

14. An apparatus for allocating plural wirelessly controllable service device nodes to appropriate switching control nodes within a building, at least some of the plural service device nodes being located in different rooms of the building with respect to each other, the apparatus comprising:
  transceivers for establishing wireless communication between: (1) a first node comprising one of the service device nodes, or one of the switching control nodes, or a gateway node in communication with a building management system for the building; and (2) second nodes comprising each of the service device nodes that is within communication range of the first node, to determine relative spatial positions of the first node and the second nodes using received signal strength indication (RSSI) values indicative of distances of separation between the first node and the second nodes, wherein at least one of the service device nodes includes one of the transceivers;
  a microprocessor for grouping the service device nodes into at least two groups, including a first group corresponding to service device nodes located in a first one of said different rooms, and a second group corresponding to service device nodes located in a second one of said different rooms, based on spatial distribution of the second nodes as indicated by the RSSI values; and
  allocation means for allocating the service device nodes of the first group to have a switching operation thereof controlled by a first of the switching control nodes, and for allocating the service device nodes of the second group to have a switching operation thereof controlled by a second of the switching control nodes.

15. The apparatus of claim 14, wherein the allocation means includes a configuration module for sending configuration signals to the service device nodes to program each of the service device nodes of the first group to respond to the first switching control node, and to program each of the service device nodes of the second group to respond to the second switching control node.

16. The apparatus of claim 14, wherein the allocation means includes a configuration module for sending configuration signals to the first switching control node to control each service device node of the first group of service device nodes, and to the second switching control node to control each service device node of the second group of service device nodes.

17. The apparatus of claim 14, wherein the microprocessor is configured to determine a network topology based on the RSSI values and to define a group boundary in the network topology where a gap between a first pair of the service device nodes that are adjacent to each other is significantly larger than gaps between other service device nodes that are adjacent to each other in the network topology.

18. The apparatus of claim 14, wherein the microprocessor is configured to determine a network topology based on the RSSI values and to define a group boundary in the network topology where a spacing between a first pair of service device nodes that are adjacent to each other is significantly larger than an average spacing between other service device nodes that are adjacent to each other in the network topology.

19. The apparatus of claim 14, wherein the microprocessor is adapted to generate a topographic map of the service device nodes in the building.

20. The apparatus of claim 19, wherein the microprocessor is adapted to compare the generated topographic map with a building services plan, and to use differences between: (1) node spacings in the topographic map, and (2) node spacings in the building plan, to establish positions of room boundaries within the building.

21. A switching control node, comprising:
   a transceiver for establishing wireless communication between the switching control node and a plurality of lighting nodes to determine relative spatial positions of the lighting nodes using received signal strength indication (RSSI) values each indicative of a distance of separation between the switching control node and one of the lighting nodes;
   a microprocessor for grouping the lighting nodes into at least two groups, including a first group corresponding to lighting nodes in one room of a building, and a second group corresponding to lighting nodes in another room of the building, based on spatial distribution of the lighting nodes as indicated by the RSSI values; and
   allocation means for allocating the lighting nodes of the first group to have a switching operation thereof controlled by the switching control node and for not allocating the lighting nodes of the second group to have a switching operation thereof controlled by the switching control node.

* * * * *